United States Patent [19]

Kondo et al.

[11] Patent Number: 4,894,682

[45] Date of Patent: Jan. 16, 1990

[54] VARIABLE MAGNIFICATION COPYING APPARATUS

[75] Inventors: Kazuyuki Kondo, Kawasaki; Jun Koide, Yokohama; Kanji Yano, Kawasaki; Makoto Tanaka, Tokyo; Haruo Tsunoi, Yokohama, all of Japan

[73] Assignee: Canon Kabushiki Kaisha, Tokyo, Japan

[21] Appl. No.: 100,453

[22] Filed: Sep. 24, 1987

[30] Foreign Application Priority Data

| | | | |
|---|---|---|---|
| Sep. 30, 1986 | [JP] | Japan | 61-232769 |
| Nov. 13, 1986 | [JP] | Japan | 61-174640 |

[51] Int. Cl.[4] ........................ G03B 27/52; G03B 27/71

[52] U.S. Cl. ........................................ 355/55; 355/67; 355/71

[58] Field of Search ............................ 355/71, 55, 67; 350/429

[56] References Cited

U.S. PATENT DOCUMENTS

| | | | |
|---|---|---|---|
| 3,970,366 | 7/1976 | Sekiguchi | 350/184 |
| 4,432,615 | 2/1984 | Ikemori | 350/429 |
| 4,459,016 | 7/1984 | Takuhara et al. | 355/71 X |
| 4,473,278 | 9/1984 | Hama | 350/429 |
| 4,586,814 | 5/1986 | Tokuhara et al. | 355/55 |
| 4,717,939 | 1/1988 | Yanagawa | 355/71 X |

FOREIGN PATENT DOCUMENTS

| | | |
|---|---|---|
| 2849128 | 5/1979 | Fed. Rep. of Germany . |
| 3426497 | 2/1985 | Fed. Rep. of Germany . |
| 58-91475 | 5/1983 | Japan . |

*Primary Examiner*—L. T. Hix
*Assistant Examiner*—D. Rutledge
*Attorney, Agent, or Firm*—Fitzpatrick, Cella, Harper & Scinto

[57] ABSTRACT

A variable magnification image forming apparatus includes a photosensitive member, a light source, projecting device for forming and projecting on the photosensitive member an image of the original illuminated by the light source, the projecting device including lens system movable in accordance with a magnification of projection selected, a first limiting member for limiting light rays disposed with a fixed positional relation with respect to the lens system, and a second limiting member for limiting light rays in the lens system, the second limiting member being displaceable in a direction different from a direction of an optical axis of the lens system in accordance with magnification change to change the positional relation with respect to the first limiting member.

30 Claims, 6 Drawing Sheets

VARIABLE MAGNIFICATION COPYING APPARATUS

FIELD OF THE INVENTION AND RELATED ART

The present invention relates to a variable magnification copying apparatus by which an original can be copied in various magnifications, more particularly to a variable magnification copying apparatus wherein exposure uniformity is maintained in varied magnification copying operations.

A slit exposure, that is, exposure of a photosensitive member to a light image through a slit, is widely used. Also, a variable magnification copying wherein, by moving a position of a projection lens for imaging, the image light is changed to change the magnification, is also widely used.

When an image exposure is effected through a slit, an amount of exposure is not uniform due to what is called $Cos^4$ law, and therefore, in order to make the exposure uniform, a correction plate is provided which is effective to correct the non-uniformity due to the $Cos^4$ law.

As for the correction plate, there are many proposals including a plurality of slits selectively usable in accordance with selected magnifications or a plate having a slit which is disposed adjacent to a photosensitive drum and which is moved in a direction perpendicular to a length of the slit (a scanning direction) together with movement of the projection lens upon magnification change.

However, those correction plates involve some problems. In the former one including a plurality of slit plates, a large number of parts are required, and in addition, the switching operation upon the magnification change or adjustment of the slit plates for the respective magnifications requires complicated and costly manipulation. In the latter including a slit adjacent to the photosensitive drum, it is difficult to mount a moving mechanism for moving the slit in a limited space, with the result that the apparatus becomes bulky.

U.S. Pat. No. 4,459,016 assigned to the assignee of this application proposes, as shown in FIG. 13 of this application, that in order to prevent the non-uniform exposure upon changed magnification, an aperture stop 110 is disposed at such a position that a cross-sectional area of projection rays from each point in an area of an original corresponding to the slit is substantially the same irrespective of magnification change, that is, adjacent a lens 108, so as to correct the $Cos^4$ law distribution. Upon magnification change, the aperture stop plate 110 is moved integrally with the lens 108 without changing the relative position between the lens 108 and the aperture stop plate 110. According to this proposal, only one plate is sufficient to correct the $Cos^4$ law distribution, irrespective of magnification change, so that the structure is simple. However, the light rays through the lens have to be blocked meeting the light amount decrease resulting from the $Cos^4$ law at marginal areas in the maximum field angle. Since, therefore, the F-number of the lens is substantially reduced, the light is not efficiently used.

In consideration of the above prior art, it is considered that the correction of the $Cos^4$ law distribution is imparted to the exposure light source, more particularly, the luminous intensity distribution provided by the light source is deliberately made non-uniform along the length of the slit to compensate the non-uniform $Cos^4$ law distribution. However, it is not possible or not easy to remove the non-uniformity of the exposure at a magnification other than a predetermined magnification for which the non-uniformity of the light source is set.

SUMMARY OF THE INVENTION

Accordingly, it is a principal object of the present invention to provide a variable magnification copying apparatus wherein non-uniformity of the exposure amount during varied magnification operation can be corrected without deteriorating the light amount use efficiency.

It is another object of the present invention to provide a variable magnification copying apparatus wherein the non-uniformity of the exposure amount is corrected with a simple construction.

It is a further object of the present invention to provide a variable magnification copying apparatus wherein the non-uniformity of the exposure amount can be accurately corrected.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENT

Figure 1:
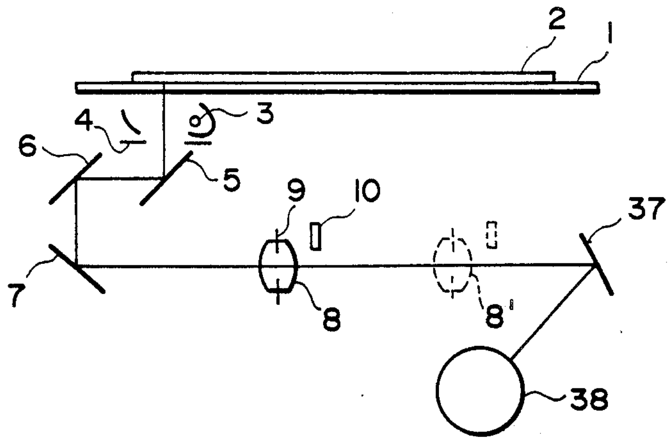
FIG. 1 shows a general optical arrangement of an optical system used in a variable magnification copying apparatus according to an embodiment of the present invention.

The preferred embodiments of the present invention will be described in conjunction with the drawings in which like reference numerals have been used throughout to designate the elements having corresponding functions.

Referring to FIG. 1, there is shown a first embodiment of the variable magnification copying apparatus according to a first embodiment. The copying apparatus includes a transparent platen glass for supporting an original 2 to be copied. The original 2 placed on the platen glass 1 is illuminated by a light source 3. The light reflected by the original 2 travels to a regulating slit 4 having a constant slit width irrespective of the magnification selected and is reflected by the mirrors 5, 6 and 7. The light bearing the image of the original is imaged on a photosensitive drum 38 (image bearing member) after being further reflected by a mirror 37 in the form of a slit having a width which is different depending on the magnification selected. The optical system includes a stop plate (pupil) having a round hole for regulating the amount of light. The stop plate 9 is disposed in a lens system 8. The optical system further includes a light blocking plate 10 disposed adjacent to the lens 8.

Figure 2:
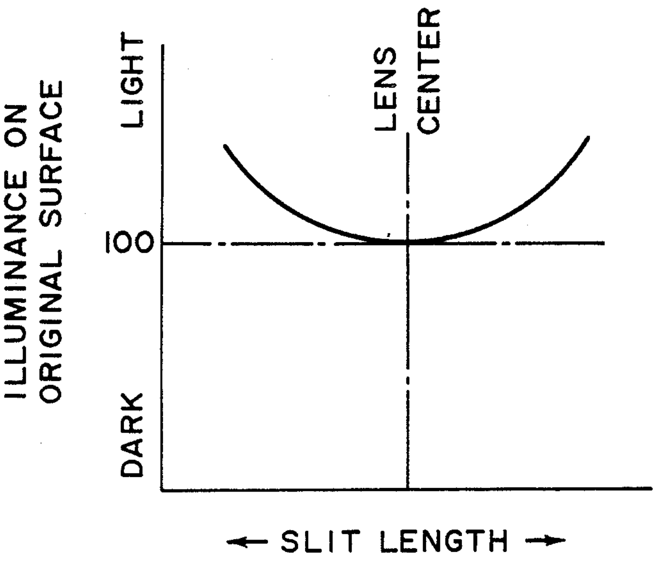
FIG. 2 is a graph showing a luminous intensity distribution provided by a light source.

Referring to FIG. 2, the illumination light source 3 has such a luminous intensity distribution that at a predetermined magnification (unit magnification, for example), the $Cos^4$ law distribution is corrected to provide a uniform illuminance distribution on the photosensitive drum 38, more particularly such that the luminous intensity is higher in the marginal areas than in the central area. Upon non-unit magnification, the lens 8 is displaced to a different position indicated by a lens 8' illustrated in broken lines along the optical axis, as shown in FIG. 1. Simultaneously, the focal length of the lens 8 is changed to maintain the conjugate relationship between the original and the photosensitive member. Upon another magnification, the lens 8 is further moved along the optical axis to a position not shown.

When the magnification is simply changed to a non-unit magnification without changing the luminous intensity distribution which has been set so as to provide the uniform exposure at the unit magnification by correcting the $Cos^4$ law distribution as shown in FIG. 2, the luminous intensity distribution becomes non-uniform along the length of the slit on the photosensitive drum 12. More particularly, when the luminous intensity distribution is determined to meet the predetermined reference magnification (unit magnification) in the illuminating light source 3, the luminous intensity is high in the marginal areas upon reduction, while it is low in the marginal areas upon enlargement.

According to this embodiment, the stop plate 9 in the lens system 8 is displaced in accordance with magnification change, particularly in the direction substantially perpendicular to the optical axis so as to change the relative positional relation with the light blocking member 10, thereby correcting the non-uniform exposure amount upon varied magnification.

Figure 3:
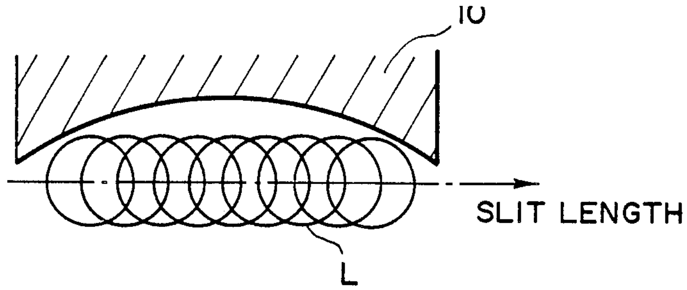
FIGS. 3 and 4 illustrate passage of light in the embodiment of FIG. 1.
Figure 4:
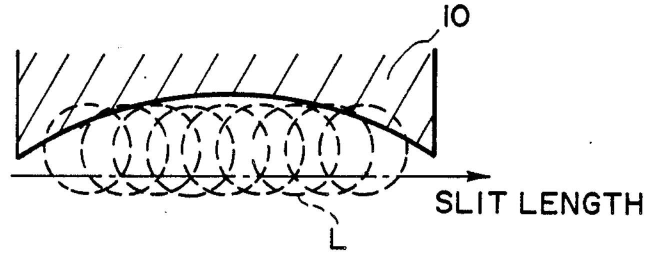

Referring to FIGS. 3 and 4, the operation will be described. In those Figures, reference L depicts bundles of light rays (wavefront) after passing through the stop plate. FIG. 3 shows the state at a reference magnification, for example the unit magnification. As will be understood, the bundles of projection rays are not blocked by the blocking member 10 upon the unit magnification, and the entire rays reach the photosensitive drum 12 to image there. Upon the unit magnification, the light source 3 provides the luminous intensity distribution to correct the non-uniform $Cos^4$ law distribution of the lens 8, and therefore the illuminance distribution on the photosensitive drum 12 is uniform in the direction of the length of the slit. FIG. 4 shows the bundles of projecting light upon reduction. The stop plate 7 moves upwardly in FIG. 1 so that the bundles shift upwardly, whereby the bundles adjacent the longitudinal ends of the slit are limited by the light blocking member 10. By this, the problem of higher illuminance adjacent the marginal areas is solved, whereby a uniform illuminance distribution can be provided on the photosensitive drum 12.

In this manner, the stop plate 9 is displaced in synchronism with movement of the lens 8 upon magnification change to displace the positions of the bundles of light rays, so that the relative positional relation between the light blocking member 10 disposed adjacent the lens 8 and the bundles of rays is changed to limit the bundles of light. Thus, the exposure amount non-uniformness can be corrected.

It is considered that the light blocking member 10 is displaced to limit the bundles of light rays. However, it is more difficult to limit the converged light rays with the same degree of accuracy. Since the cross-sectional area of the bundles of light is small, even a slight displacement of the light blocking member 10 influences to a greater extent the correction of the bundles to be passed, and therefore, this is not preferable. In view of this, it is preferable that the stop plate 9 in the lens system 8 is displaced. Particularly, in the case that the lens system has a symmetrical arrangement, it is preferably displaced at a position at the center in the optical axis direction.

In the description of the foregoing embodiment, the case of the uniformity correction upon reduction has been described. In the case of enlargement, the shape of the light blocking member 10 is reversed, that is, the light blocking member 10 has a height distribution wherein the height in the middle portion is lower than that of the marginal areas to block more light at the central portion, so that the problem of higher illuminance adjacent the center than the marginal area can be removed to make the exposure amount uniform.

In the foregoing embodiment, the uniform illuminance can be maintained at a unit magnification plus a reducing magnification or a unit magnification plus an enlarged magnification.

Figure 5:
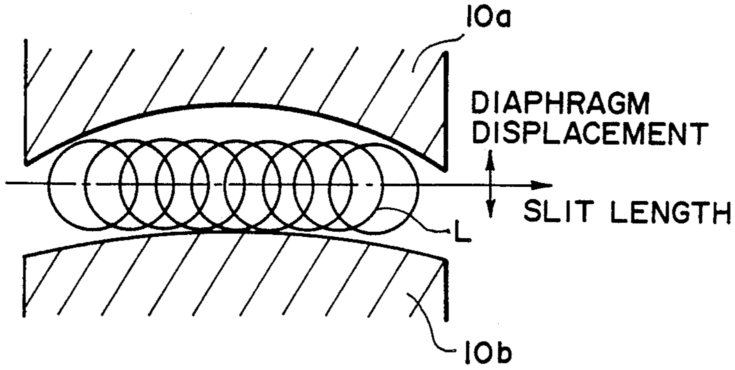
FIG. 5 illustrates another example of a light blocking plate.

Referring to FIG. 5, another embodiment will be described, wherein the non-uniform exposure can be corrected in a wider range covering enlargement and reduction. The light blocking member 10 in this embodiment comprises a light blocking portion 10*a* in which the marginal portions are closer to the optical axis than the central portion and a light blocking portion 10*b* in which the central portion thereof is closer to the optical axis than the marginal portions 10*b*.

As shown in FIG. 4, upon reduction, the stop plate 9 in the lens system 8 is moved upwardly to shift the bundles of light upwardly to limit the light in the marginal portions, whereas upon enlargement, it is shifted downwardly to displace the bundles down to limit the light in the marginal portion, so that the non-uniformity of the exposure amount can be corrected both upon enlargement and reduction. The reference magnification for which the luminous intensity distribution by the $Cos^4$ law may be corrected in the light source at any magnification. However, it is preferable that the reference position is the unit magnification since it is most frequently used. In order to further increase the usable amount of light by easing the limitation to the central rays at the central portion along the slit length, however, it is preferable that the reference magnification is an enlarging magnification. If the reference magnification is set to be the maximum enlargement magnification, the central rays are not limited at any magnifications.

Referring to FIGS. 6–12, a further embodiment of the present invention will be described.

Figure 6:
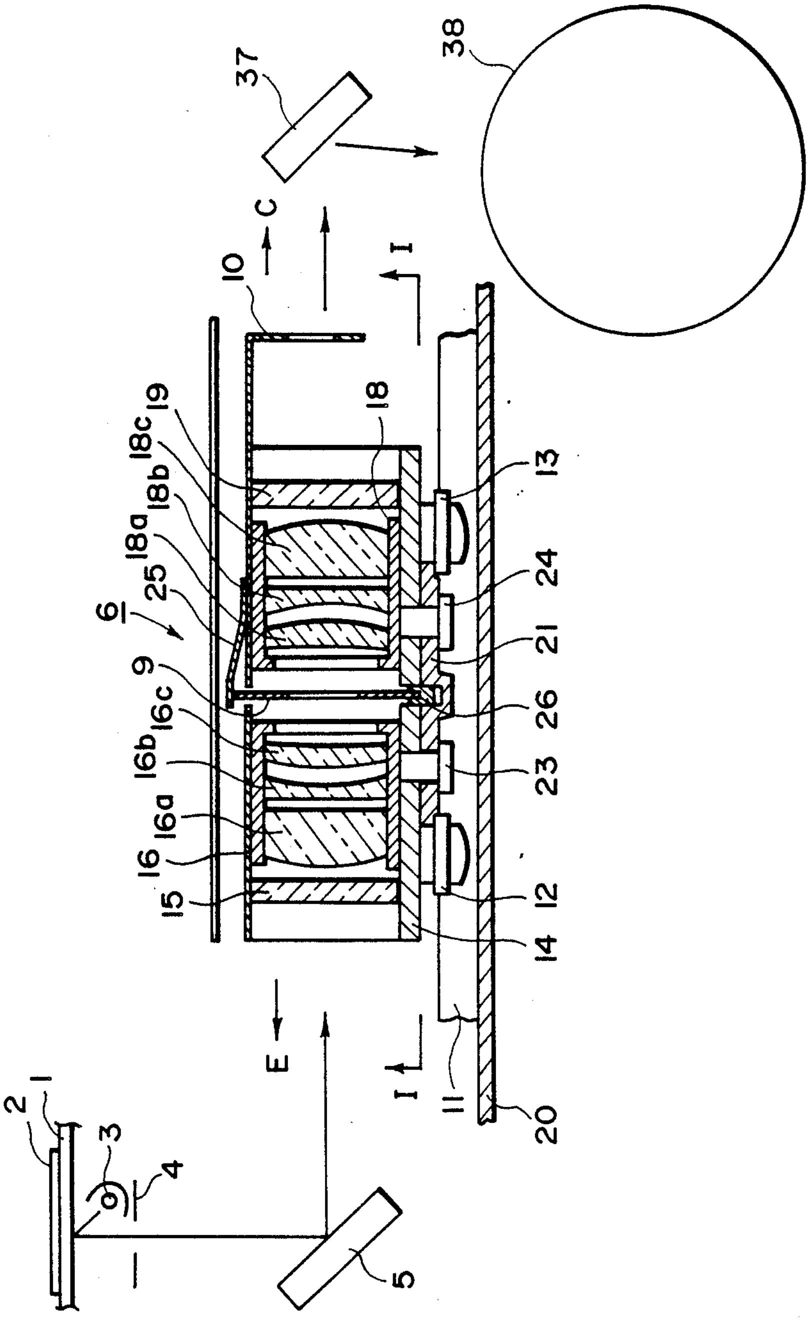
FIG. 6 shows an optical system used in a variable magnification copying apparatus according to another embodiment of the present invention.

FIG. 6 shows a variable magnification copying apparatus according to this embodiment. The optical lens system 6 is displaceable along an optical axis thereof in accordance with magnification change, and it includes a zoom lens system having a continuous variable focal length in accordance with the magnification selected. The apparatus according to this embodiment is substantially the same as of FIG. 1 except for the lens system described above and the image exposure system. In the image exposure system of FIG. 1, the original is fixed, whereas the image exposure optical system is movable to scan the original through the slit, but in this embodiment, the image exposure optical system is stationary, whereas the original is moved to scan the original through the slit.

Figure 7:
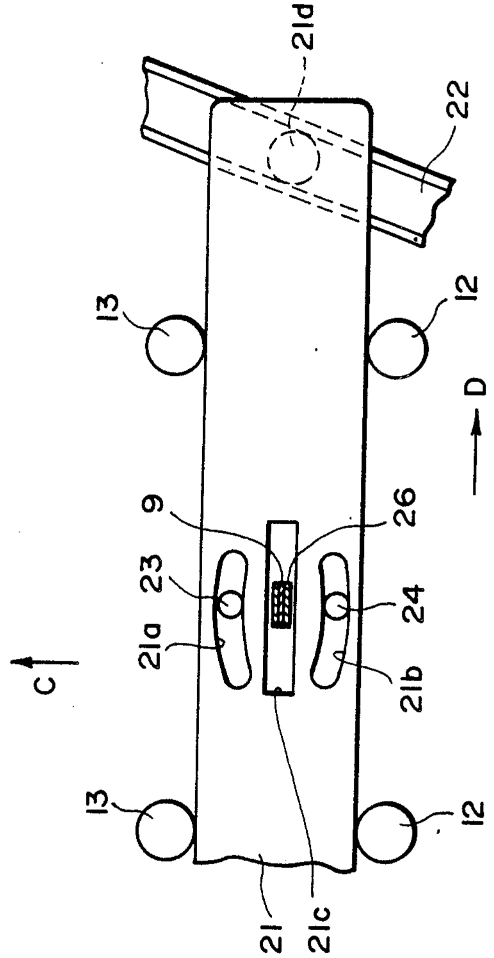
FIG. 7 is a top plan view of a mechanism for moving a stop plate.

FIGS. 6 and 7 illustrate particularly the optical lens system 6. A lens base 20 is fixed on a main frame of the copying apparatus. On the lens base 30, a rail 11 is mounted extending in the direction of the optical axis. The optical lens system 6 is supported on and guided by the rail 11 through collars 12 and 13. The movement is effected by a motor not shown. The optical lens system 6 includes a lens 15 supported in a lens barrel 14, lenses 16*a*, 16*b* and 16*c* supported in another lens barrel 16, a stop plate 9 provided with a substantially rectangular stop aperture 9*a* (FIG. 8) adjacent a center, lenses 18*a*, 18*b* and 18*c* supported in a further lens barrel 18, a lens 19 and a reinforcing plate 10 which also functions as a light blocking member; these elements are disposed in the order named from the light source side. To the bottom surface of the lens barrel 14, a cam plate 21 is contacted, and the cam plate 21 has curved cam grooves 21*a* and 21*b* and an inclined cam groove 21*c*. Adjacent an end of the cam plate 21 a projection 21*d* is formed extending downward, which is slidably engaged with a rail 22 extending inclinedly with respect to the optical axis at a predetermined angle. The cam grooves 21*a* and 21*b* are slidably engaged with connecting members 23 and 24, respectively. The connecting members 23 and 24 have upper ends fixed to the lens barrels 16 and 18, respectively.

Figure 8:
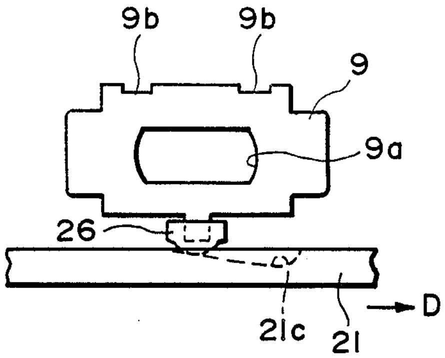
FIG. 8 is a front view of the stop plate.

FIG. 8 is a front view of the stop plate 9. The top surface of the stop plate 9 is provided with recesses 9*b* to which leaf springs 25 are engaged at their ends, the leaf springs 25 having the other ends fixed to the upper portion of the lens barrel 18, whereby the stop plate 17 is normally urged downwardly. On the other hand, the bottom of the stop plate 9 is engaged with a sliding member 26 which is a cam follower. The sliding member 26 is in contact with the inclined cam groove 21*c* in the cam plate 21, so that the stop plate 9 is displaceable in a direction perpendicular to the optical axis.

Figure 9:
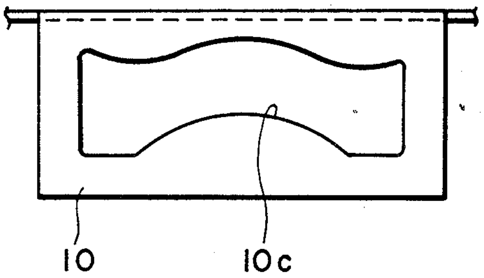
FIG. 9 is a front view of a light blocking plates.
Figure 10:
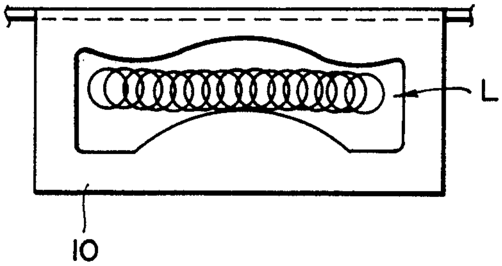
FIGS. 10–12 illustrate correction of the non-uniform exposure.

FIG. 9 is a front view of the correcting plate 10 which, as will be understood from the figure, has a curved through aperture 10*c* which is larger in the marginal portions than in the central portion.

Figure 11:
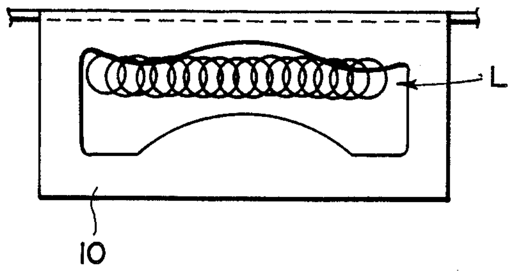

In operation, upon reduction, the lens barrel 14 is moved along the rail 11 in the direction indicated by an arrow C. Then, the cam plate 21 moves in the direction indicated by an arrow D so that the moving force of the lens barrel 14 along the optical axis is converted to a moving force in a direction different from the direction of the optical axis, more particularly, to the direction substantially perpendicular to the optical axis. Thus, the stop plate 9 is moved up by the inclined cam groove 21*c*, and simultaneously, the lens barrels 16 and 19 are moved toward each other by being guided by the cam grooves 21*a* and 21*b*, respectively so as to change the focal length of the lens system to that for the reduction imaging. In this manner, the stop plate 9 is moved up upon the magnification change to a reducing magnification, so that the projecting light position L relative to the correcting plate 20 is moved up from the position for the unit magnification (FIG. 10), and therefore, the amount of light at marginal areas is limited as shown in FIG. 11. As a result, the problem of the higher illuminance in the marginal portions upon a reduced magnification is eliminated, whereby the photosensitive drum 38 is exposed to image light with uniform illuminance distribution.

Figure 12:
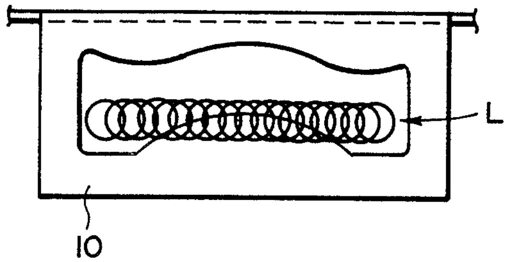
Figure 13:
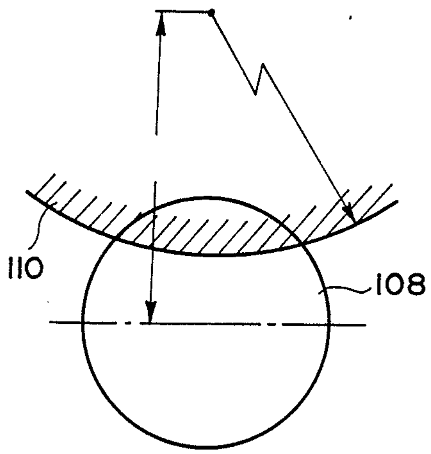
FIG. 13 PRIOR ART
FIG. 13 illustrates a conventional structure for correcting the non-uniformity of the exposure amount.

Upon enlargement, the lens barrel 14 moves along the rail 11 in the direction indicated by an arrow E, and the stop plate 9 moves down as contrasted to the case of the magnification change to the reduction. Simultaneously, the lens barrels 16 and 19 are moved away from each other along the cam grooves 21*a* and 21*b*, so that the focal length is changed to that for an enlarging magnification. In this manner, the stop plate 9 is moved downwardly upon enlargement so as to shift the positions of the projecting light bundles L, and therefore the light amount in the middle is limited as shown in FIG. 12. As a result, the problem of lower illuminance in the marginal portions is eliminated, whereby the photosensitive drum 38 is exposed to image light with uniform illuminance distribution along the slot.

As described, upon the unit magnification, the light source is so determined that the illuminance distribution is uniform on the photosensitive drum 38; upon reduction, the amount of light for the marginal portions are limited since otherwise the illuminance at the marginal portions are high; and upon enlargement, the light amount in the middle portion is limited since otherwise the illuminance in the marginal areas is low. Therefore, the illuminance distribution can be made uniform at all times on the photosensitive drum 38, so that the non-uniformity of the amount of exposure light can be corrected. In addition, in this embodiment, the stop plate 9 is moved by cooperation between a slide member and a cam plate which is moved together with the movement of the optical lens system 6 on the rail, whereby the structure is very simple. Furthermore, the position of the stop plate is correctly determined in accordance with the lens system position at all times, and therefore, the non-uniformity of the exposure is accurately corrected. Particularly, the accuracy is high in the case of a zoom lens being used, since the cam and the cam follower are associated with the focal length change of the zoom lens. However, the present invention is not limited to the case of the zoom lens used, but is applicable to the case where the lens system has a fixed focal length.

In the foregoing embodiment, the correcting plate 10 is disposed at an image side of the lens 19, whereas the stop plate 9 is disposed between the lens barrel 16 and the lens barrel 18, but this is not limiting, and may be changed by ordinary persons skilled in the art.

The configuration of the slit of the stop plate 9 and the slit of the correcting plate 10 may be determined in accordance with the positions where they are mounted and the positional relation therebetween. However, the correcting plate 10 preferably has a light blocking portion which is closer to the optical axis in the middle portion than in the marginal portions and a light blocking portion which is closer to the optical axis in the marginal portions than in the central portion, those light blocking portions being opposed to each other.

Any parts of the structures described in the foregoing may be combined within the spirit of the present invention.

While the invention has been described with reference to the structures disclosed herein, it is not confined to the details set forth and this application is intended to cover such modifications or changes as may come within the purposes of the improvements or the scope of the following claims.

What is claimed is:

1. A variable magnification exposure apparatus, comprising:

a light-receiving member;

a light source for illuminating an original;

projecting means for projecting through a slit an image of an original illuminated by said light source on said light-receiving member, said projecting means including lens means movable in accordance with a magnification of projection selected;

a correcting member, disposed in a fixed positional relation to said lens means, for correcting non-uniformity of exposure of said light-receiving member to the projected image along a longitudinal direction of the slit; and an aperture stop member movable in a direction substantially perpendicular to an optical axis of said lens in accordance with the magnification selected;

wherein, by movement of said aperture stop member, the relative position between said correcting member and the light rays that pass through said lens means, is maintained with high precision.

2. An apparatus according to claim 1, wherein said light source provides luminous intensity distribution wherein it is higher in marginal positions than in a central position.

3. An apparatus according to claim 1, wherein said correcting means is disposed behind said lens means, and said correcting member does not limit central rays having passed through said lens means when the selected magnification is a predetermined reference magnification.

4. An apparatus according to claim 3, wherein said correcting means does not limit in a direction of a length of the slit the rays having passed through said lens means.

5. An apparatus according to claim 3, wherein the reference magnification is a unit magnification.

6. An apparatus according to claim 3, wherein the reference magnification is an enlarging magnification.

7. An apparatus according to claim 1, wherein said aperture stop member is disposed at a center of said lens means.

8. An apparatus according to claim 1, further comprising means for converting a force for driving said lens means into a force in a different direction, means for operatively coupling said converting means with said aperture stop member, wherein said aperture stop member is moved by said converting means and said coupling means.

9. A variable magnification exposure apparatus, comprising:

a light-receiving member;

an elongated light source for exposing through a slit said light-receiving member to a light image of an original, said light source extending in a direction parallel to the slit;

lens means for imaging the light from said light source on said light-receiving member;

a correcting member for correcting non-uniformity, due to magnification change of the exposure on said light receiving member along the longitudinal direction of the slit; and wherein said light source has such a luminous intensity distribution that the luminous intensity is higher in the marginal areas than the central area.

10. An apparatus according to claim 9, wherein said correcting member is partly in an optical path of said lens means, in a degree which is different at the central areas than at the marginal areas along the longitudinal direction of the slit.

11. An apparatus according to claim 10, wherein said correcting member is more into the optical path at the central area than at the marginal areas.

12. An apparatus according to claim 9, wherein said correcting member is disposed in a fixed positional relation with said lens means.

13. An apparatus according to claim 9, wherein said correcting member has correcting portions at both sides of the optical axis of said lens means.

14. A variable magnification exposure apparatus, comprising:

an elongated light source for exposing through a slit a light-receiving member to a light image of an original, said light source extending in a direction parallel to the slit;

lens means movable in accordance with a magnification selected;

a correcting member for correcting non-uniformity, due to magnification change, of the exposure along the longitudinal direction of the slit said correcting member having correcting portions which are above and below the slit; and wherein said light source has such a luminous intensity distribution that the luminous intensity is higher in the marginal areas than in the central area.

15. An apparatus according to claim 14, wherein said correcting portions have different correcting functions.

16. An apparatus according to claim 15, wherein one of said correcting portions blocks more of the rays at the end area, than at the central area, and the other blocks more of the rays at the central area than at the marginal areas.

17. A variable magnification copying apparatus, comprising:

zoom lens means for changing its focal length in accordance with a magnification selected;

a movable member movable in accordance with the selected magnification to limit light rays;

a first cam for changing the focal length of said zoom lens;

a second cam for moving said movable member; and wherein said first and second cams are formed on one member.

18. An apparatus according to claim 17, wherein said correcting member is an aperture stop member.

19. An apparatus according to claim 17, wherein said first cam has a curved cam surface.

20. An apparatus according to claim 17, wherein said second cam has an inclined cam surface, and said correcting member is moved by said second cam in a direction perpendicular to the optical axis.

21. An apparatus according to claim 17, wherein said member having the first and second cams is guided by a cam for moving the lens.

22. A variable magnification exposure apparatus, comprising:

a light source for exposing through a slit a light-receiving member to a light image of an original;

lens means movable in accordance with an image magnification selected;

a correcting member for correcting non-uniformity of the exposure along a longitudinal direction of the slit, said correcting member maintaining a constant distance from said lens means in a direction of an optical axis of said lens means independently of the magnification selected, wherein said correcting member permits light rays to pass without limitation thereby at a reference magnification.

23. An apparatus according to claim 22, wherein said reference magnification is a unit magnification.

24. An apparatus according to claim 22, wherein said reference magnification is an enlarging magnification.

25. An apparatus according to claim 22, wherein said light source is brighter at its marginal areas than at its central area.

26. An apparatus according to claim 22, wherein said correcting member is partly in an optical path of said lens means in a degree which is different at a central area than at an end area along a longitudinal direction of the slit.

27. An apparatus according to claim 26, wherein said correcting member is more into the optical path of the lens means at the central area than at the marginal areas.

28. An apparatus according to claim 22, wherein said correcting member has correcting portions which are above and below the slit.

29. An apparatus according to claim 28, wherein said correcting portions have different correcting functions.

30. An apparatus according to claim 29, wherein one of said correcting portions blocks more of the rays at the marginal portions than at the central area, and the other blocks more of the rays at the central area than at the marginal area.

* * * * *

UNITED STATES PATENT AND TRADEMARK OFFICE

CERTIFICATE OF CORRECTION

PATENT NO. : 4,894,682

DATED : January 16, 1990

INVENTOR(S) : KAZUYUKI KONDO ET AL.

It is certified that error appears in the above-identified patent and that said Letters Patent is hereby corrected as shown below:

COLUMN 2

Line 44, "plates." should read --plate.---.

COLUMN 8

Line 28, "slit said" should read --slit, said--.

COLUMN 9

Line 2, "selected;" should read --selected; and--.

Signed and Sealed this

Twenty-seventh Day of August, 1991

Attest:

HARRY F. MANBECK, JR.

Attesting Officer

Commissioner of Patents and Trademarks